May 7, 1957 H. F. SMITH 2,791,235
BALL COCK VALVE
Filed Sept. 8, 1955
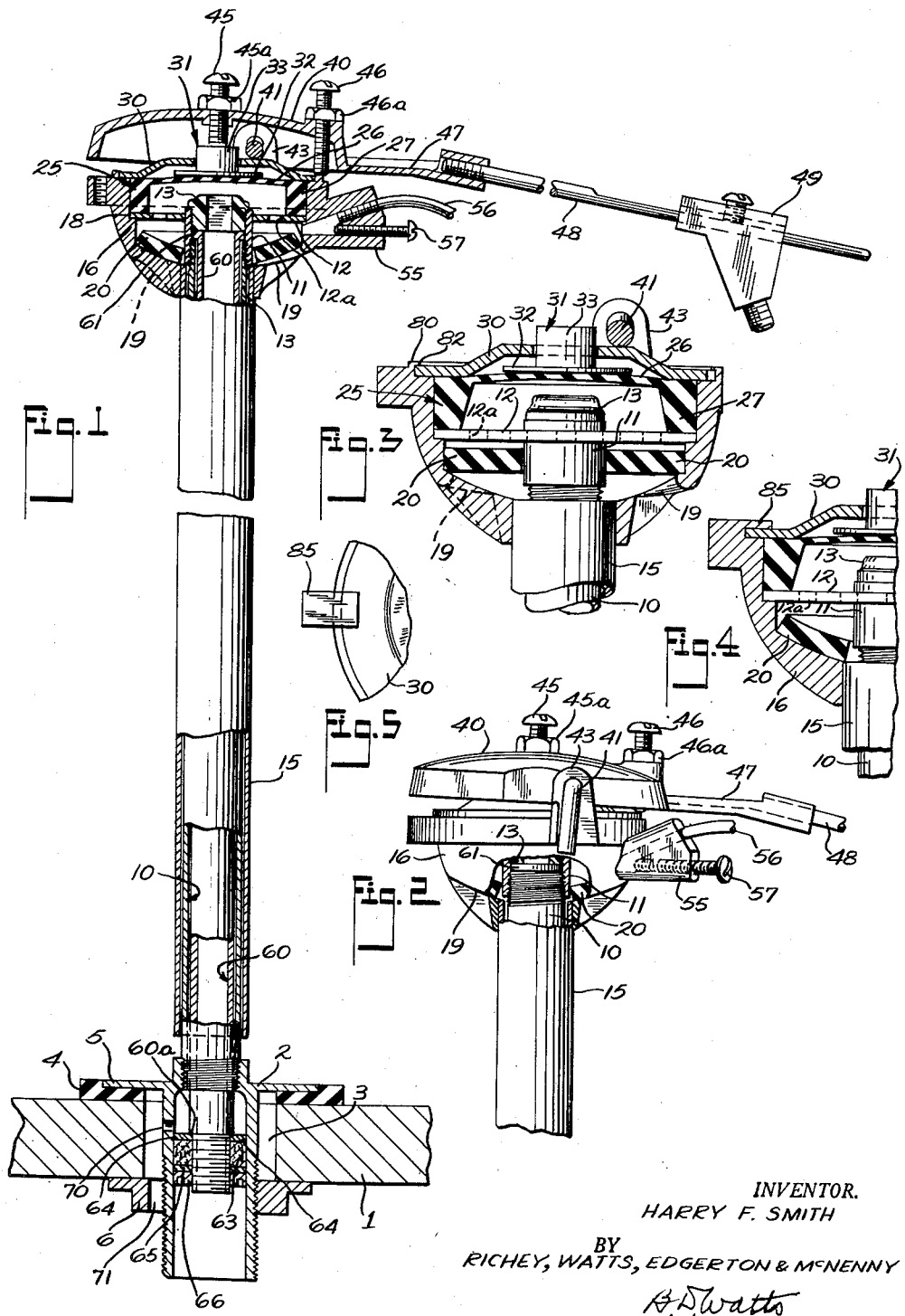
INVENTOR.
HARRY F. SMITH
BY
RICHEY, WATTS, EDGERTON & McNENNY
ATTORNEYS

United States Patent Office 2,791,235
Patented May 7, 1957

2,791,235

BALL COCK VALVE

Harry F. Smith, Lexington, Ohio, assignor to Mansfield Sanitary Pottery, Inc., Perrysville, Ohio, a corporation of Ohio Application September 8, 1955, Serial No. 533,188

8 Claims. (Cl. 137—437)

This invention relates generally to inlet valves for water closet flush tanks and is particularly concerned with a new inlet valve of the stationary hush pipe type which may be provided with means for excluding from the water supply line any water leaking from the tank into the inlet pipe.

Inlet pipe flush valves often develop small holes through their walls which are not readily detectable and which permit water from the interior of the tank to enter the inlet pipe and mingle with, and possibly contaminate, the supply water in the street pipe. The detection of such leaks is especially difficult in inlet valves of the hush pipe type where the hush pipe surrounds, and conceals from view, most of the length of the inlet pipe in the tank.

The existence of this problem has long been recognized and, in fact, some municipalities have adopted codes which require that inlet valves shall be provided with means which would prevent any such commingling of tank water with the supply water.

Devices which has been proposed heretofore to meet such codes have not been entirely satisfactory because they included parts which are not necessary in cities where such codes are not in force and which make the devices too expensive to meet competition in such cities. So far as I know, no one heretofore has devised an inlet valve which would meet not only such codes where they exist, but also competition in cities where there are no such codes. The present invention provides an inlet valve of the hush pipe type which may be sold competitively in cities having, as well as those lacking, such codes.

Apparatus embodying this invention may be converted from a condition in which it may be used where there are no such codes to a condition which will meet the codes, by the expedient of adding thereto a few parts and thereby making a new combination of elements. The present invention also provides a new combination of new elements and old elements which has a new mode of operation and gives new results.

In the drawings attached hereto and forming a part of this specification:

Fig. 1 is a partly sectional, side elevational view of one form of apparatus embodying the present invention;

Fig. 2 is a fragmentary, enlarged partly sectional view taken on line 2—2 of Fig. 1;

Fig. 3 is a view similar to Fig. 2 but showing a modified form of the invention;

Fig. 4 is a view somewhat similar to Figs. 2 and 3 but showing still another form of the invention; and Fig. 5 is a top plan view of a part of the apparatus of Fig. 4.

In Figs. 1 and 2, the bottom wall 1 of a flush tank has a spud 2 projecting down through a hole 3 therein and a gasket 4 is disposed between the inner surface of wall 1 and the outstanding flange 5 of spud 2. A nut 6 screw-threaded onto the lower end of the spud presses against wall 1 and, by compressing gasket 4 against the inner surface of wall 1, effectively seals opening 3 against escape of water from within the tank. It will be understood that the lower end of spud 2 is to be connected to a water supply line which is not shown.

An inlet pipe 10 is threaded at its lower end into spud 2 and at its upper end is provided with a valve seat assembly which consists of a cylinder 11 threaded onto the upper end of the inlet pipe 10, a rigid disk 12 perforated as at 12a and surrounding and secured to the upper end of cylinder 11, and a valve seat 13 preferably composed of "nylon" and screwed into cylinder 11 and projecting a short distance thereabove.

A hush pipe 15 surrounds inlet pipe 10 and extends from a point a short distance above spud 2 to a point adjacent to the lower end of cylinder 11. It is provided at its upper end with a valve body 16 affixed thereto. This body has an internal shoulder 18 on which partition 12 may rest and has a plurality of holes 19 (for example four holes) below the partition. A flexible ring 20 is positioned in the valve body below partition 12 and is movable to an up position as shown in Fig. 3, where it serves to close the holes 12a in partition 12 and to a down position as shown in Fig. 1, where it serves to close holes 19 leading out of the valve body.

In valve body 16 above partition 12 is located a combined resilient seal and valve 25 which has a thin disk portion 26 and an axially extending marginal flange 27 on its inner side. The outer surface of flange 27 lies close to the surrounding inner cylindrical surface of body 16 and may be pressed thereagainst by the force of water flowing from the inlet pipe through the valve seat 13. A resilient, dished, metal valve cover 30 is engageable with the upper end of valve body 16 and the adjacent part of the upper side of member 25 and serves to hold the latter in place in the former. A plunger 31 has an enlarged inner end 32 engageable with the central part of the disk portion 26 of seal member 25, and a cylindrical portion 33 extending through a central hole in cover 30.

A valve cap 40 is pivotally mounted on a rod 41 which is rotatable in ears 33 projecting upwardly from the valve body. The mid-portion of rod 41 is bent out of axial alignment with the ear engaging parts so that when rotated it will engage valve cover 30 and force it down against the upper end of the valve body as mentioned above. When this bent rod is rotated out of contact with cover 30 it may be withdrawn from the ears, thereby permitting disassembly of the valve cap and the body. The cap 40 carries a screw 45 which may be adjusted toward or away from plunger 31 to regulate the extent of outward movement of the plunger 31 and is locked in position by nut 45a. The valve cap also carries another similar screw 46 which may be adjusted toward or away from body 16 to limit the pivoting movement of the cap and float ball downwardly and is locked in position by nut 46a. The valve cap 40 has an arm 47 projecting therefrom which is fitted with a short float rod 48 and the latter is provided with a float rod extension 49 on which a float ball (not shown) may be mounted. It will be noted that the extension may be adjusted to different positions on rod 48.

Valve body 16 is provided with a side extension 55 which is drilled to receive re-fill tube 56 opening into the body below partition 12 and an intersecting flow regulating screw 57. By adjustment of the screw 57 the flow of water through tube 56 may regulated.

A tube 60 is disposed within the inlet pipe 10 and has a ring 61 affixed to its upper end to engage on the upper end of the inlet pipe within cylinder 11. Near its lower end which is located in spud 2, pipe 60 is fitted with a deformable packing ring 63 positioned between an upper metal ring 64 which seats against a shoulder 60a on the pipe and a lower ring 65 which is movable toward and away from ring 64 by nut 66 screw-threaded onto the lower end of the pipe 60. By turning nut 66 and thereby moving ring 65 toward ring 64, the deformable packing 63 may be pressed outwardly into liquid-sealing contact with the inner surface of spud 2. The shoulder 60a serves to locate the ring 64 below a drain hole 70 in the spud 2. As will be noted, ring 6 is cut away as shown at 71.

The operation of the apparatus just described will be evident to those skilled in the art but, briefly stated, is as follows:

When the flush valve is opened and the water level in the tank falls, water under the pressure existing in the supply pipe flows through spud 2 and pipe 60 and out through the central opening in valve seat 13. This water lifts the disk portion 26 of the combined seal and valve member 25 as far as is permitted by the stop screws 45 and 46. The water escaping through the valve seat 13 flows down through holes 12a in partition 12, thereby distorting the ring 20 downwardly into a position closing the holes 19 in the body 16. The water then flows through the space between the inlet pipe 10 and the hush pipe 15 and escapes into the tank at the bottom of pipe 15. When the flush valve is closed and the surface of water in the tank raises the float ball and pivots the valve cap 40 about pin 41, plunger 31 forces the disk portion 26 of member 25 down against the upper end of the valve seat 13, thereby interrupting the flow of water out of the inlet pipe.

When water no longer flows through the partition 12, ring 20 springs up into a position parallel and close to the under side of the partition. In case the pressure in the inlet pipe should fall and a tendency to syphon water out of the tank should arise, ring 20 would be moved to close openings 12 in the partition and hence to prevent the syphoning action.

It will be understood that the water pressure in the chamber defined by members 25 and 12 is effective in pressing the flange 27 of member 26 into fluid sealing engagement with the surrounding cylindrical wall of the valve body 16. Thus this member 25 performs the double duty of sealing against escape of fluid upwardly out of the chamber in the valve body between flange 27 and the valve body and also of sealing the outlet end of the inlet pipe.

If and when any holes develop in inlet pipe 10 and any liquid passes therethrough from the tank into the interior of the inlet pipe, such water will flow down into the spud 2 and then out through openings 70 and 71. The packing 63 will prevent such water from getting into the water from the street supply line and hence this apparatus will meet the requirements of certain municipalities as above stated.

When the above-described apparatus is to be used in places where there are no codes which require means for preventing tank water which passes through holes in the inlet pipe from getting into the street supply line, certain of the above-described parts may be omitted and thereby the apparatus may be made competitive with inlet valves of the hush pipe type which meet the requirements of such places. To convert the apparatus of Figs. 1 and 2 into an apparatus which does not have any means for preventing tank water from getting into the street supply line through holes in the inlet pipe, it is necessary only to omit pipe 60 and the parts connected to it and to substitute for spud 2 a conventional spud which lacks the drain hole 70.

In Fig. 3 the body 16 is provided with an annular flange 80 extending upwardly to above the top surface of cover 30. Opposite the pin 41, flange 80 is undercut to form an overhang 82 to overlap top 30 when the latter is in fully assembled position. It will be understood that when pin 41 is rotated to press the top 30 tightly against the body 16, friction between the pin and top will move top 30 laterally into the space below overhang 82. This overhang effectively prevents the escape of any fluid out of the body between it and the resilient member 25 at places remote from pin 41.

In Figs. 4 and 5 another modification of the apparatus of Fig. 1 is shown. In this case, the body 16 has a lip 85 which extends inwardly over the upper surface of cover 30 at a point opposite the engagement of the pin 41 with top 30. In this case the lip 85 is of substantial length so that when top 30 is being assembled with body 16 the edge of that top 30 is slipped into place underneath lip 85.

Having thus described the present invention so that others skilled in the art may be able to understand and practice the same, I state that when I desire to secure by Letters Patent is defined in what is claimed.

What is claimed is:

1. An inlet valve for a flush tank comprising an inlet pipe having at its lower end a spud extending through a bottom wall of the tank and provided with a drain hole and an outlet end above the water level in the tank, a valve to seal the outlet end of said inlet pipe, float-controlled means for actuating said valve to inlet-pipe-closing position, a tube inside the inlet pipe and extending from the outlet end of the inlet pipe into the spud below said drain hole and compressible means in said tube for sealing the space between the tube and spud below the drain hole.

2. An inlet valve for a flush tank comprising an inlet pipe having at its lower end a spud extending through a bottom wall of the tank and provided with a drain hole and an outlet end above the water level in the tank, a valve to seal the outlet end of said inlet pipe, a hush pipe around the inlet pipe, a valve housing around the upper end of said hush pipe, float-controlled means for actuating said valve to inlet-pipe-closing position, a tube inside the inlet pipe and extending from the outlet end of the inlet pipe into the spud below said drain hole in the spud and compressible means on said tube for sealing the space between the tube and spud below the drain hole.

3. An inlet valve for a flush tank comprising an inlet pipe having its outlet end above the water level in the tank, a hush pipe around the inlet pipe, a valve body attached to the hush pipe, a rigid partition fixed to the inlet pipe in the body and having water outlet holes therethrough, a valve seat carried by said partition and having fluid sealing engagement with the outlet end of said inlet pipe, and means for controlling the flow of water through said inlet pipe comprising a resilient valve in the body having a peripheral axial flange on its inner side engageable with the outer peripheral portion of said partition and a central portion engageable with said seat, means to press said valve against the valve body and partition with fluid sealing engagement, a plunger engaging the central part of the valve, means to move the plunger to press the valve against the valve seat with fluid sealing engagement, a tube inside the inlet pipe engaging the outlet end of the inlet pipe and extending into a spud having a drain hole and compressible means on said tube for sealing the space between the tube and spud below the drain hole.

4. An inlet valve for a flush tank comprising an inlet pipe having its outlet end above the water level in the tank, a hush pipe around the inlet pipe, a valve body attached to the hush pipe, a rigid partition fixed to the inlet pipe in the body and having water outlet holes therethrough, a valve seat carried by said partition and having fluid sealing engagement with the outlet end of said inlet pipe, and means for controlling the flow of water through said inlet pipe comprising a resilient valve in the body having a peripheral axial flange on its inner side engageable with the outer peripheral portion of said partition and a central portion engageable with said seat, a valve cover seating on said body and engageable with said peripheral portion of the resilient valve, a plunger engaging the central part of the valve and extending through said cover, a valve cap engageable with said plunger, and a pin pivotally connecting said cap to said body and urging the cover downwardly and laterally on the body.

5. An inlet valve for a flush tank comprising an inlet pipe having its outer end above the water level in the tank, a hush pipe around the inlet pipe, a valve body attached to the hush pipe and having an open upper end and air inlet holes in its lower end, a rigid partition fixed to the inlet pipe in the body having water outlet holes therethrough and carrying a valve seat having fluid-tight engagement with the outer end of said inlet pipe, means for controlling the flow of water through said inlet pipe comprising a resilient valve in the body having an outer peripheral portion engageable with the outer peripheral portion of said partition and a central portion spaced from said partition and engageable with said seat, a valve cover engageable with the outer portion of the resilient valve, a plunger engaging the central portion of said valve and extending through said cover and means engageable with said plunger and connected to said cover to press the central part of the valve against the valve seat with fluid sealing engagement, and means to control the flow of air through said air inlet holes comprising a resilient ring in said body below said partition and movable under differential pressure to close the air inlet holes when water is flowing through said water outlet holes in said partition and to open said air inlet holes when the pressure in the inlet pipe is below atmospheric pressure.

6. An inlet valve for a flush tank comprising an inlet pipe having its outlet end above the water level in the tank, a hush pipe around the inlet pipe, a valve body surrounding and attached to the outlet end of the hush pipe, said body having an open upper end and air inlet holes in its lower end, a rigid partition in said body, fixed to the inlet pipe, having water outlet holes therethrough and carrying a valve seat having fluid tight engagement with the outlet end of said inlet pipe, means for closing the upper end of said valve body and controlling the flow of water through said inlet pipe, said means comprising a resilient valve having a peripheral axial flange on its inner side engageable with the outer peripheral portion of said partition and a central portion engageable with said seat, means to press the peripheral portion of the outer surface of said valve against said partition and the valve body with fluid sealing engagement and a plunger engaging the central part of the valve to press it against the valve seat with fluid sealing engagement, and means to control the flow of air through said air inlet holes comprising a resilient ring in said body below said partition and movable under differential pressure to close the air inlet holes when water is flowing through said water outlet holes in said partition and to open said air inlet holes when the pressure in the inlet pipe is below atmospheric pressure.

7. An inlet valve for a flush tank comprising an inlet pipe having its outlet end above the water level in the tank, a hush pipe around the inlet pipe, a valve body about said outlet end of the inlet pipe and attached to the hush pipe, said body having an open upper end, upper and lower shoulders, and a plurality of holes in its lower end, a rigid partition in said body, fixed to the inlet pipe, seated on the lower one of said shoulders in the valve body and having water outlet holes therethrough, a valve seat fixed in said partition and having fluid seating contact with the open end of said inlet pipe, a flexible ring in the body around said inlet pipe on the lower side of said partition and serving alternately to cover the water outlet holes in said partition and the air inlet holes in the valve body, a combined resilient seal and valve in the valve body having a peripheral axial flange on its inner side engageable with the outer peripheral portion of said partition and a central portion engageable with said seat, a valve cover seating on the upper shoulder in the valve body and engageable with the peripheral portion of the outer surface of said valve to clamp said flange against said partition and a valve body with fluid sealing engagement, a plunger engaging the central part of the valve and projecting through said valve cover, a valve cap having means engageable with the outer end of said plunger to close said valve, and means pivotally connecting said valve cap to said valve body and pressing said valve cover against said upper shoulder.

8. An inlet valve for a flush tank comprising an inlet pipe having its outlet end above the water level in the tank, a hush pipe around the inlet pipe, a valve body about said outlet end of the inlet pipe, attached to the hush pipe, and having air inlet holes in its lower portion, a rigid partition fixed to the inlet pipe in the housing and having water outlet holes therethrough, a valve seat fixed in said partition, a flexible ring in the body around said inlet pipe below said partition and serving alternately to cover the water outlet holes in said partition and the air inlet holes of the valve body, a combined resilient seal and valve in the valve body having a peripheral axial flange on its inner side engageable with the outer peripheral portion of said partition and a central disc portion engageable with said seat, a valve cover engageable with the outer surface of the peripheral portion of said valve to press said flange against said partition and valve body with fluid sealing engagement, a plunger engaging the central part of the valve and projecting through said valve cover, a valve cap pivotally connected to said housing, adjustable means carried by said cap and engageable with the outer end of said plunger for varying the water level in the tank, adjustable means carried by said cap and engageable with said housing for varying the extent of opening of the valve, a float lever attached to said cap, a refill tube carried by said housing and communicating with the interior thereof on the inner side of said partition, a tube inside the inlet pipe engaging the outlet end of the inlet pipe and extending into a spud having a drain hole and compressible means on said tube for sealing the space between the tube and spud below the drain hole.

References Cited in the file of this patent
UNITED STATES PATENTS 2,706,998    Bletcher et al.  ---------- Apr. 26, 1955
2,707,969    Langdon  --------------- May 10, 1955